Oct. 17, 1939.  W. E. KERSHAW  2,176,428
SECONDARY OR STORAGE BATTERY
Filed July 15, 1938
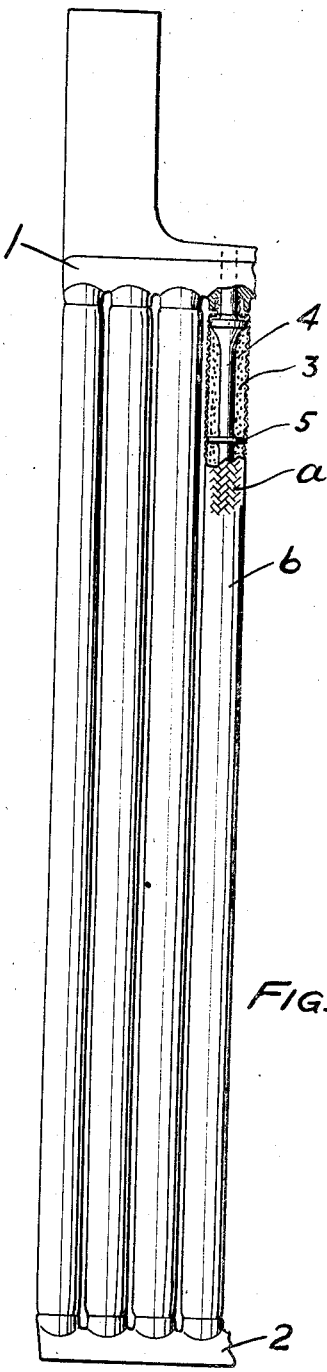
Fig. 1.
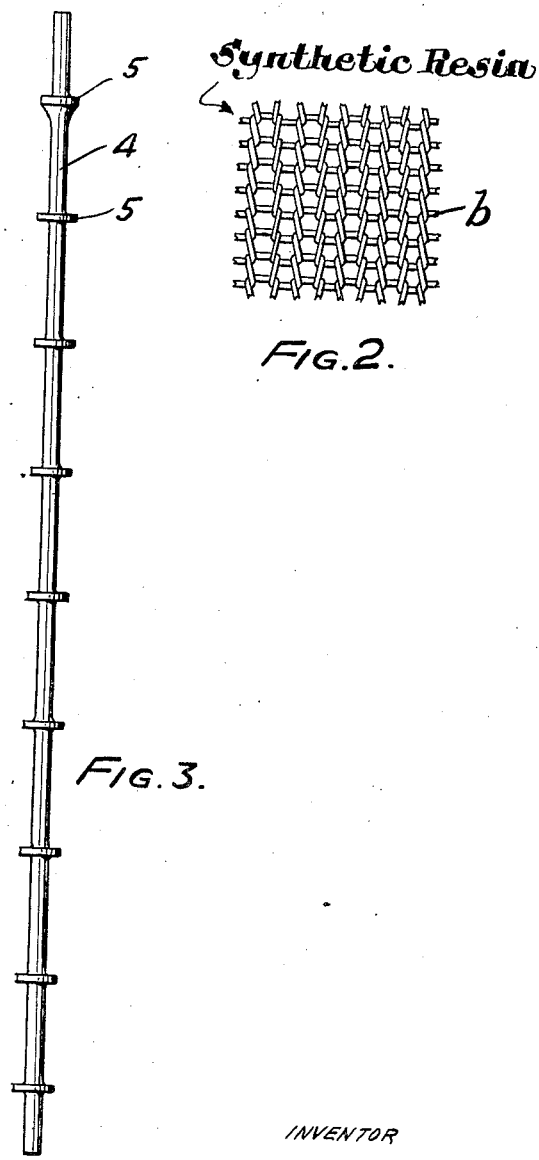
Fig. 2.
Fig. 3.
INVENTOR
William Ernest Kershaw
BY
Augustus B. Stoughton
ATTORNEY.
WITNESS:
Rob't R. Mitchel.

Patented Oct. 17, 1939

2,176,428

UNITED STATES PATENT OFFICE 2,176,428

SECONDARY OR STORAGE BATTERY

William Ernest Kershaw, Gwynedd Valley, Pa., assignor to The Electric Storage Battery Company, Philadelphia, Pa., a corporation of New Jersey Application July 15, 1938, Serial No. 219,299

2 Claims. (Cl. 136—55)

The present invention relates to improvements in storage battery plates of the tubular type consisting of pencils of active material or material to become active in each of which is embedded a spine or rod and the spines or rods are connected at their ends with top and bottom bars and the pencils are surrounded by tubular retainers. In use these spines or rods grow or become enlarged in diameter throughout their lengths and this growth is practically irresistible. The pencils of active material tend to soften and shed particles and the particles forming masses operate to short-circuit the plates. At the surface of the pencils of the respective plates there is a powerful oxidizing environment.

The most generally employed material from which to make the tubular retainers is slotted hard rubber. However, hard rubber under the pressure of the growth of the spines and the powerful oxidizing environment occasionally ruptures with the result that electrical contact between the pencils and the spines is interrupted and with the further result that the softened active material sheds a deposit which tends to short-circuit the plates.

Asbestos has been suggested as a material from which to make the tubular retainers but, so far as I know, it has never gone into use no doubt because even when in the form of fabric, and, therefore, necessarily in association with cotton, it loses its strength and coherence in a battery, and certain of its components, those containing for example iron are soluble in the electrolyte.

I have discovered that filaments or threads of synthetic resin in a state of molecular saturation are resistant to and resilient in the powerful oxidizing environment prevailing at the surface of the filaments and of the pencils. Threads of this material fabricated into tubes increase the efficiency of a storage battery and the excellence of this material was not known in advance although it was known that the material was thermoplastic and inert to ordinary oxidation by exposure to the air and to attack by such reagents as nitric and hydrofluoric acid, bromine and potassium permanganate.

In the accompanying drawing I have illustrated a plate or electrode embodying features of the invention and in the drawing:

Fig. 1 is a side view of a part of a plate or electrode embodying features of the invention and showing partly in section a tubular braided fabric made of threads of synthetic resin in a state of molecular saturation.

Fig. 2 is a view indicating that the fabric is of the knitted variety.

Fig. 3 is a view of one of the spines.

The synthetic resins employed in the practice of this invention may be defined as solid unvulcanized polymerization products of unsaturated organic compounds, such products becoming essentially saturated in the process of polymerization. The state of molecular saturation referred to in this definition imparts a high degree of chemical stability such as is resistant to the powerful oxidizing and electrochemical environment prevailing at the surface of the positive active material in a storage battery.

Examples of saturated polymerization products are polyvinyl esters such as polyvinyl chloride and polyvinyl acetate or their co-polymers, polymethyl methacrylate and other acrylic resins and polystyrene. These products are designated vinyl resins.

In preparing these products the polymerization must be carried to a point where the material has passed beyond the gummy or plastic state to the solid state (at room temperature) without the aid of vulcanization.

In the practice of the invention the thread, filament or fiber used to make the tubular envelope may comprise one or a mixture of two or more of the compounds mentioned, with or without a filler and with or without a plasticizer.

Referring to the drawing, the top and bottom bars are indicated at 1 and 2. The pencils of active material are indicated at 3 and the spines which connect the top and bottom bars are indicated at 4. The spine 4 is provided with integral spaced collars 5 and these, when present tend to sub-divide the pencils into sections, and this subdivision localizes their defects, if any, and the collars are also useful in molding the pencils onto the spines before the application of the tubular retainers. 6 indicates the tubular retainer which, of course, must be pervious for the passage of the ions. The necessary porosity is provided in a fabric of saturated synthetic resin but compared with slotted rubber the pores are very much smaller and thus the fabric opposes the passage of fine particles which may be shed from the pencils. Braided tubes of the character described and indicated at a, or knitted fabrics as indicated at b, to a greatly enlarged scale, are possessed of greatly increased efficiency because of the properties or qualities of the material substituted and these properties and qualities were unknown in the battery art and in advance of the present invention and they impart to the battery when employed as envelopes in either knitted or braided form, a much more efficient action in respect to durability, life, capacity and efficiency. The increase in life may be attributed to the fact that the threads are inert in respect to the conditions prevailing in a storage battery and the efficiency may be attributed to the fact that the described threads retain resilience under battery conditions so that electrical contact between the active material and the spines or rods is maintained without interruption.

I claim:

1. A storage battery having plates comprising pencils of active material or material to become active mounted on metallic spines, and tubular fabric retainers enclosing the pencils and consisting of filaments capable of textile fabrication and consisting of vinyl resin which is resistant to and resilient in the environment prevailing at the surface of the pencils, and said filaments accommodating growth of the spines and softening of the active material while keeping them in electrical contact and without rupture of the fabric, thereby improving the life and efficiency of the battery.

2. A storage battery having electrodes consisting of pencils of active material mounted on spines connected to top and bottom bars and provided with tubular retainers made of fabric consisting of resilient threads of synthetic vinyl resin inert and resilient under conditions prevailing in a storage battery, thereby increasing the efficiency and life of the storage battery.

WILLIAM ERNEST KERSHAW.